June 26, 1956

W. F. MOHLER 2,751,891

FLUID ACTUATED MOTOR

Filed Sept. 23, 1953

Inventor
WILLIAM F. MOHLER
By
C. G. Stratton
Attorney

June 26, 1956 W. F. MOHLER 2,751,891
FLUID ACTUATED MOTOR
Filed Sept. 23, 1953 2 Sheets-Sheet 2

Inventor
WILLIAM F. MOHLER
By C. F. Stratton
Attorney

United States Patent Office 2,751,891
Patented June 26, 1956

2,751,891
FLUID ACTUATED MOTOR

William F. Mohler, Hermosa Beach, Calif., assignor of one-third to John Vedder, West Covina, and one-third to Borgert Vedder, Fullerton, Calif.

Application September 23, 1953, Serial No. 381,907

7 Claims. (Cl. 121—164)

This invention relates to a fluid-operated motor which is maintained in continuous operation by a constant supply of a fluid under pressure, it being an object of the invention to provide a motor in which a piston is automatically reciprocated by the fluid, such as compressed air, the flow of the fluid being controlled by means shifted by the piston of the motor at the ends of the piston stroke.

Another object of the invention is to provide a fluid-actuated motor of the character indicated that embodies novel valving means controlling two paths of flow for the fluid, such as compressed air or the like, and which valving means is automatically shifted by the piston of said motor to change the air flow from one path to the other and, thereby, reverse the movement of the piston.

A further object of the invention is to provide a motor, as indicated, that automatically vents spent compressed air through the above-mentioned valving means.

A still further object of the invention is to provide a reciprocative motor that is adapted to operate under the power of a constantly-supplied relatively low air pressure, and which motor is small, compact, and long-lived.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Figure 1:
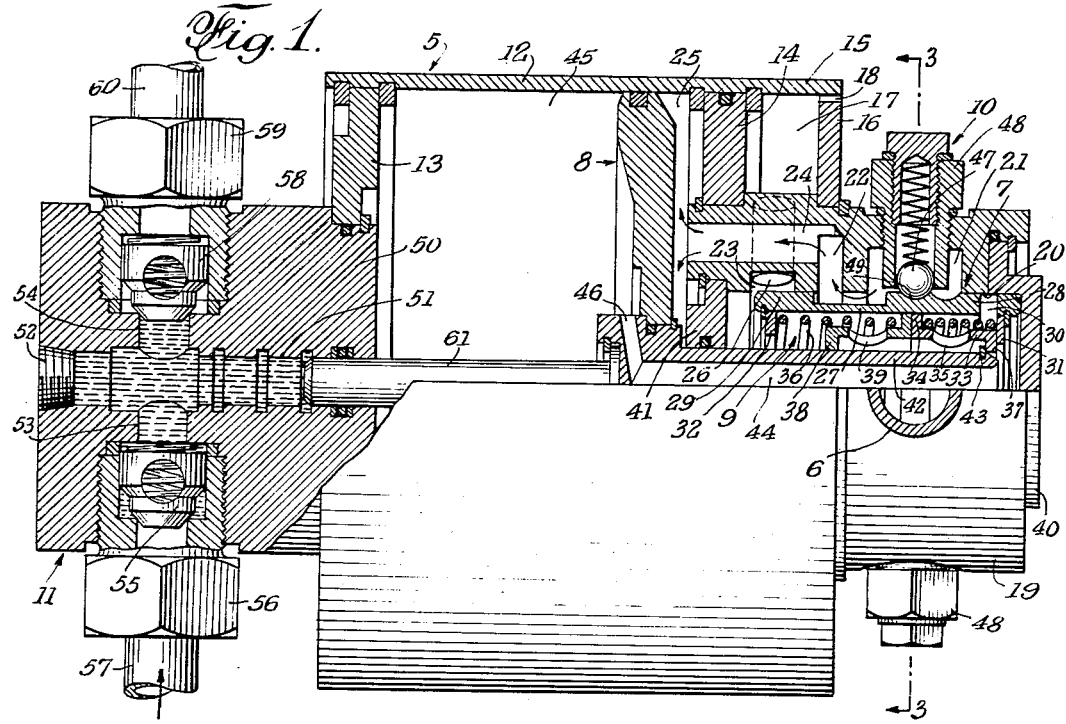
Fig. 1 is a partial side elevational and partial longitudinal sectional view of a motor according to the present invention and showing the same at one end of its stroke.

The present motor comprises, generally, a preferably cylindrical housing 5, a compressed air inlet 6 to said housing, piston valve means 7 controlling the flow of air from said inlet in two paths, an air piston 8 subject to the pressure of said flow according to the path of said flow-controlling valve means, lost-motion means 9 interconnecting the valve means 7 and piston 8 to effect control of the former by the latter, detent means 10 cooperating with the means 9 to impart a snap action operation to said valve means 7 as the same shifts from one position to another under control of the piston 8, and a positive displacement pump 11 that is operated by movement of piston 8.

The housing 5, in its intermediate part, comprises a cylinder 12 that is defined at one end by a transverse wall 13 and at the other by a transverse partition 14. The cylinder 12 is extended at 15, beyond partition 14 and is closed by an end wall 16. An exhaust chamber 17 is defined between partition 14 and wall 16 and the same is vented to atmosphere through openings 18 in said wall 16.

Figure 3:
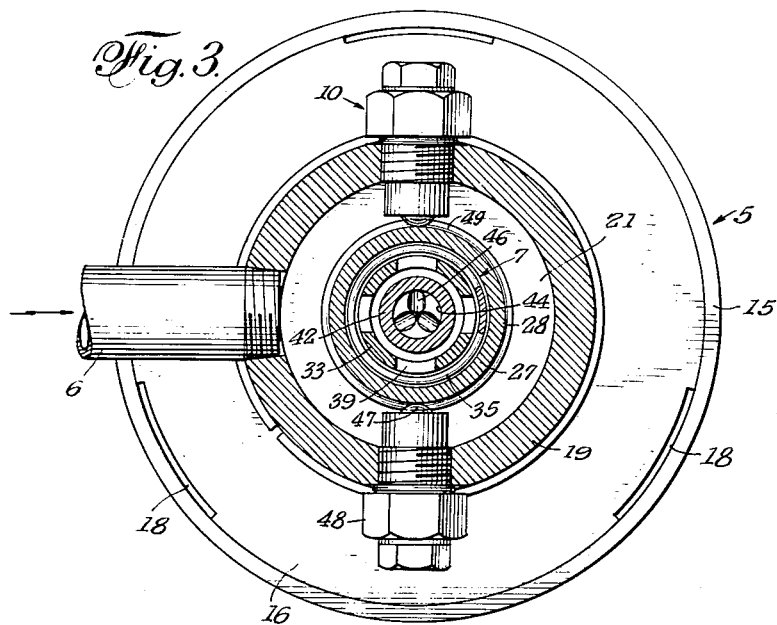
Fig. 3 is a cross-sectional view as taken on line 3—3 of Fig. 1.
Figure 4:
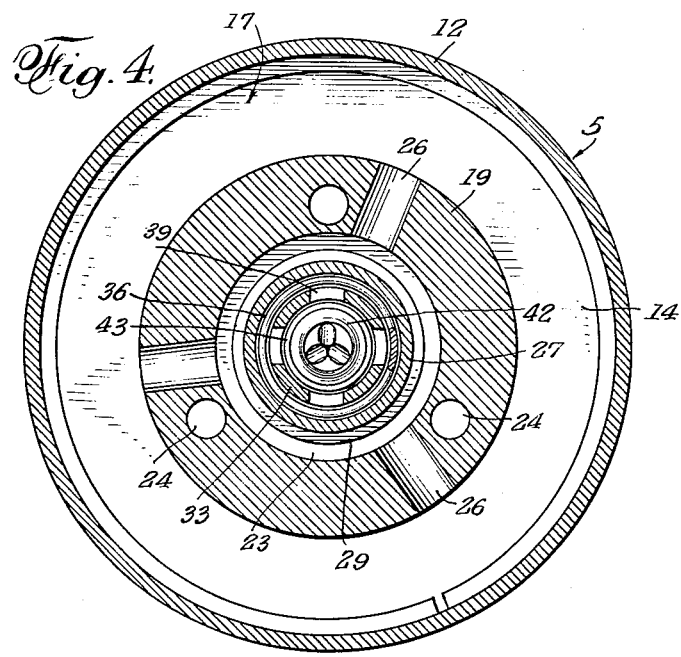
Fig. 4 is a cross-sectional view as taken on line 4—4 of Fig. 2.

As shown in the drawings, the right end of housing 5 comprises a cylindrical hub 19 that extends through suitable bores in partition 14 and wall 16. Said hub has a central bore 20 and, from right to left, said bore is interrupted by an annular air chamber 21, a second annular air chamber 22, and an annular exhaust chamber 23. The mentioned air inlet 6 comprises a pipe that connects to hub 19 and opens into chamber 21, as best seen in Fig. 3. A plurality of longitudinal bores 24 communicates annular chamber 22 and the interior 25 of cylinder 12. A plurality of radial bores 26 communicates annular chamber 23 and exhaust chamber 17.

The mentioned positive displacement pump 11 is provided at the left end of housing 5.

The piston valve means 7 is disposed in bore 20 and comprises a sliding hollow sleeve 27 that is provided with bore-fitting ends 28 and 29 that are so spaced that end 28, when the sleeve is at the left position (Fig. 2), is adapted to close air flow between chambers 21 and 22, and end 29, when the sleeve is at the right position (Fig. 1), is adapted to close flow between chambers 22 and 23. The end 28 is provided with one or more circumferential openings 30 that communicate chamber 21 with the interior of sleeve 27 when the sleeve is in the position of Fig. 2.

At its opposite ends, sleeve 27 is provided with inwardly extending annular flange abutments 31 and 32 that are alternately engaged by the ends of a spring-balanced follower 33 disposed interiorly of said sleeve and substantially shorter than said sleeve between the flange abutments thereof. Said follower is provided with a central outer flange 34 that serves as a common abutment for the adjacent ends of compression springs 35 and 36 which, at their other ends are in respective abutment with flange abutments 31 and 32. The ends of follower 33 are provided with inwardly directed flanges 37 and 38. The follower is skeletonized by suitable holes 39 so that the movement of air flow sleeve 27 is unimpaired by said follower. The end limits of movement of sleeve 27 comprise an end wall 40 affixed to the outer end of hub 19 and an end partition 41 in substantial alignment with partition 14.

The matter in the preceding paragraph describes the lost-motion means 9 that interconnects piston 8, operating in cylinder 12, and the valve means 7, the interconnection being achieved by a piston stem 42 that is coaxial with sleeve 27 and follower 33 and is provided with an outer flange 43 that has alternate abutting engagement with flanges 37 and 38 of said follower. Said stem 42 has an interior passage 44 that is open at the right end and at the left end is in communication with the interior 45 of cylinder 12 on the left side of piston 8 by means of radial passages 46.

The detent means 10 is shown as opposed spring-urged ball detents 47 in radially disposed holders 48 carried by hub 19, and two annular grooves 49 formed in the outer periphery of sleeve 27 that are alternately engaged by said ball detents.

The positive displacement pump 11 is shown as a block 50 extending from housing wall 13 and provided with a bore 51 coaxial with the piston stem 42. The end of said bore is plugged as at 52. Transverse or radial passages 53 and 54 intersect bore 51. The flow of fluid in passage 53 is controlled by an inlet check valve 55 carried by a fitting 56, said valve 55 opening only to admit fluid from a pipe 57 into passage 53 and, thus, into bore 51. The passage 54 is controlled by an outlet check valve 58 carried by a fitting 59, said valve 58 opening only to pass fluid from bore 51 and passage 54 outward through a pipe 60. A piston or plunger 61, carried by piston 8, is longitudinally movable in bore 51 and, when projected thereinto, displaces fluid in said bore outward through pipe 60. It will be noted that piston 8 is considerably larger in area than is plunger 61. Therefore, the latter operates with such force that a total pressure in bore 51 is created that is many times greater than the unit pressure that is effective on piston 8. Thus, a relatively low air pressure at inlet 6 is multiplied many times and results in an extremely high output pressure at pipe 60.

Operation

With piston 8 retracted as in Fig. 1, the valve sleeve 27 is held by the detent means 10 so that flow of pressure air follows the arrows shown in Fig. 1 to impinge on the face of piston 8 that is on the side of chamber 25 of cylinder 12. This pressure is effective to move said piston to the left and, therefore, cause plunger 61 to displace fluid in bore 51 past outlet check valve 58 and out through pipe 60.

It will be noted that spring 35 was compressed at the start of this movement. Consequently, when flange 43 on stem 42 moves toward the left, said spring expands and moves follower 33 to the left also until the two springs 35 and 36 are in balance to hold said follower in an intermediate position while projection of piston 8 continues. During this movement, any compressed air present in chamber 45 of cylinder 12 is vented to atmosphere through passages 46 and 44, the interior of sleeve 27, bore 20 (left end), annular chamber 23, radial bores 26, exhaust chamber 17, and openings 18.

As the piston 8 nears the end of its stroke to the left, flange 43 encounters flange 38 of the spring follower 33 and moves said follower to the left compressing spring 36. When the pressure of said spring builds up sufficiently to overcome the holding power of detents 10, the resultant force snaps sleeve 27 from its position at the right to the position at the left closing off pressure air to the chamber 25. While this action is instantaneous, some further movement of piston 8 to the left may follow, but, in any case, the advance of said piston is finally arrested by engagement of flange 43 and follower flange 38. Actually, this movement may never occur since, as seen in Fig. 2, at the instant that valve sleeve 27 is shifted to the left, cylinder chamber 25 is vented to atmosphere through bores 24, chambers 22 and 23, bores 26, exhaust chamber 17, and openings 18, and spring 36 is freed to expand and, not only arrest the projection of piston 8, but also partly retract the same.

Figure 2:
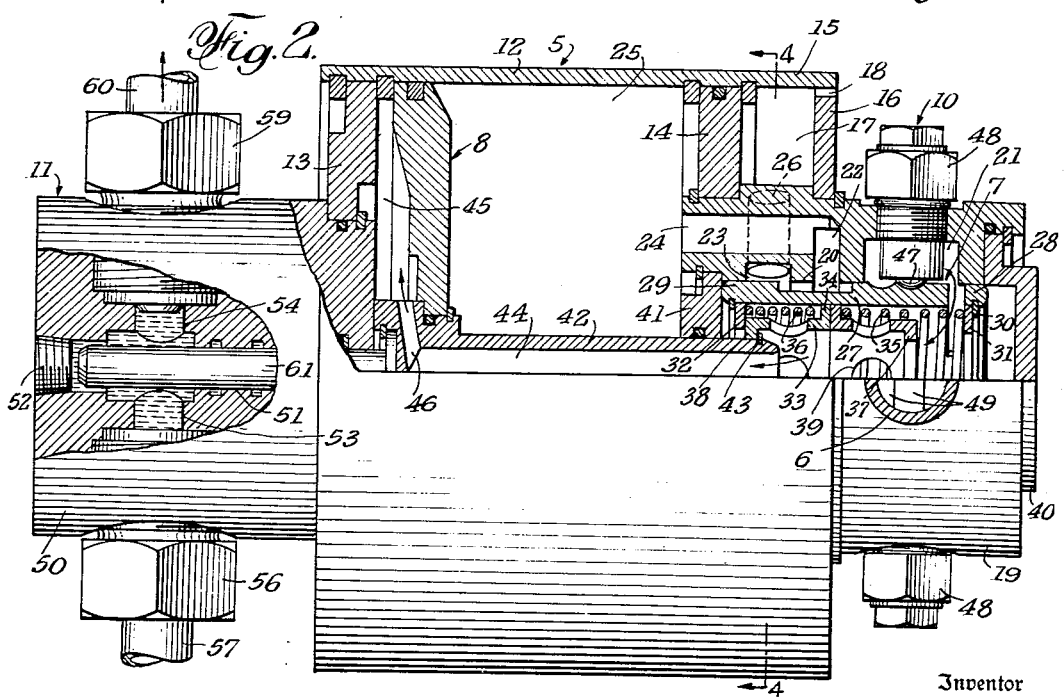
Fig. 2 is a similar view of said motor and showing the same at the other end of its stroke.

As seen in Fig. 2, the above shift of valve sleeve 27 to the left brings openings 30 of said sleeve into register with inlet chamber 21 so that compressed air in said chamber can follow the arrows of Fig. 2 and impinge on the face of piston 8 that is on the side of chamber 45 of cylinder 12. This pressure is effective to move said piston to the right and, therefore, caue retraction of plunger 16. Check valve 55 automatically opens at this time to admit fluid from pipe 57 to enter and fill bore 51.

Retraction of piston 8 continues until flange 43 encounters follower flange 37 to move the follower to the right and compress spring 35. Now, when the force of this spring overcomes the detents 10, the valve sleeve 27 shifts to the right completing the cycle of operation.

In practice, the mechanism may not depend on the force of springs 35 and 36 overcoming the detents 10. The flange 43, after picking up flange 37 or 38, as the case may be, may move said flanges into respective engagement with flanges 31 and 32 of the sleeve 27 and, thereby, cause a positive start of shifting movement of said sleeve. Then, as the sleeve is freed of the detent force, springs 35 and 36, whichever is compressed, snaps the sleeve to its new position.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. A motor comprising a housing having a cylinder and a hub, said hub being provided with a concentric bore smaller than said cylinder, three annular chambers opening on said bore, a sleeve slidable in said bore and cooperating with the wall of said bore to control the flow of pressure fluid between the chambers, one of said chambers being connected to a pressure fluid inlet and communicating with an adjacent chamber through said bore, said sleeve having an opening adapted to communicate the first mentioned chamber with the interior of said sleeve, said adjacent chamber being in communication with the third chamber through said bore and in communication with said cylinder through a longitudinal passage, radial passage means venting said third chamber to atmosphere, a piston in said cylinder, a hollow stem on said piston extending into said sleeve, the piston being movable in one direction by pressure of fluid flowing through the first-mentioned chamber and adjacent chamber and said longitudinal passage, and movable in the other direction by fluid flowing through said first-mentioned chamber, the opening in the sleeve, the interior of said sleeve, and said hollow piston stem, and lost-motion means interconnecting the sleeve and the piston stem to cause endwise shifting of the former by the latter during the end portions of the stroke of the latter.

2. A motor actuated by a fluid under pressure, comprising a housing having a cylinder and a hub, said hub being provided with a concentric bore smaller than said cylinder, three annular chambers opening on said bore, a sleeve slidable in said bore and cooperating with the wall of said bore to control the flow of said fluid between the chambers, one of said chambers being connected to a pressure fluid inlet and communicating with an adjacent chamber through said bore, said sleeve having an opening adapted to communicate the first mentioned chamber with the interior of said sleeve, said adjacent chamber being in communication with the third chamber through said bore and in communication with said cylinder through a longitudinal passage, radial passage means venting said third chamber to atmosphere, a piston in said cylinder, a hollow stem on said piston extending into said sleeve, the piston being movable in one direction by said fluid flowing through the first-mentioned and adjacent chambers and said longitudinal passage, and movable in the other direction by fluid flowing through said first-mentioned chamber, the opening in the sleeve, the interior of said sleeve, and said hollow piston stem, detent means releasably holding the sleeve in one end position or the other, and lost-motion means interconnecting the sleeve and the piston stem to release said sleeve from the holding force of the detent means and cause endwise shifting of the sleeve by the stem during end portions of the stroke of the stem.

3. A motor according to claim 2: a follower member interposed between the sleeve and piston stem, end abutments on said sleeve limiting endwise movement of said follower member, and counter-balancing spring means between the follower member and sleeve, said spring means being compressible when the piston stem engages the follower member and the follower member engages one of said end abutments to release the sleeve from the holding force of the detents.

4. A motor actuated by a fluid under pressure, said motor comprising, in combination, a piston and a cylinder in which said piston is adapted to reciprocate, a hollow stem attached to said piston and concentric with said cylinder, a detent-held valve sleeve, said sleeve being mounted on said stem, lost-motion means interconnecting said piston and said sleeve and operative to shift said sleeve endwise, passage means controlled by said sleeve to conduct pressure fluid to impinge on one face of the piston to project the same, and independent passage means in communication with said hollow stem and also controlled by said sleeve to conduct pressure fluid to impinge on the opposite face of the piston to retract the same.

5. A motor according to claim 4: passage means to vent said cylinder on the side opposite to the side of the piston being subjected to the pressure of said fluid, said latter passage means being also controlled by said valve sleeve.

6. A motor actuated by a source of fluid under pressure, said motor including a housing, a cylinder within said housing, a piston having first and second sides for reciprocating said piston within said cylinder by said fluid, a detent-held sleeve valve within said housing, said sleeve valve being a hollow cylinder for providing a duct through said valve, a pressure chamber within said housing connected to said source, said chamber surrounding the mid-portion of said sleeve valve, a first passage connecting said pressure chamber to said cylinder on the first side of said piston, a second passage connecting said chamber to said cylinder on the second side of said piston, said second passage including the hollow portion of the cylinder of said sleeve valve and a hollow stem concentrically mounted with said sleeve valve and said piston and fixed to said piston, lost-motion means interconnecting said stem and said sleeve valve for actuating said sleeve valve by said piston through said stem and said means for connecting said first side of said piston to said pressure chamber at the end of one stroke of said piston through said first passage, and then to the second side through said second passage, and exhaust ports in said housing, said lost-motion means, said housing and said sleeve valve also including follower means for connecting said first and second sides of said piston to said exhaust ports immediately at the conclusion of a respective stroke of said piston.

7. A motor as defined in claim 6, in which said follower means includes a second hollow cylinder slidingly mounted on said stem and within said sleeve valve, and first and second springs for normally holding said second cylinder in a central, neutral position within said sleeve valve, the sliding engagement between said second cylinder and said stem for actuating said second cylinder into two positions for actuating said sleeve valve through said springs.

References Cited in the file of this patent
UNITED STATES PATENTS

| | | |
|---|---|---|
| 375,200 | Ross et al. | Dec. 20, 1887 |
| 1,094,811 | Reagan et al. | Apr. 28, 1914 |
| 2,597,443 | Broughton | May 20, 1952 |
| 2,658,485 | Dreyer | Nov. 10, 1953 |